United States Patent [19]

Young

[11] Patent Number: 4,762,364
[45] Date of Patent: Aug. 9, 1988

[54] CHILD RESTRAINT DEVICE

[75] Inventor: Quentin Young, San Antonio, Tex.

[73] Assignee: Rock-A-Bye Restraint Company, Inc., San Antonio, Tex.

[21] Appl. No.: 82,195

[22] Filed: Aug. 4, 1987

[51] Int. Cl.$^4$ ............................................. A47D 1/10
[52] U.S. Cl. ................................... 297/250; 297/349; 297/364; 297/130
[58] Field of Search .............. 297/250, 254, 130, 134, 297/349, 364

[56] References Cited

U.S. PATENT DOCUMENTS

| | | | |
|---|---|---|---|
| 1,508,576 | 9/1924 | Remde | 297/349 |
| 1,577,807 | 3/1926 | Orwick | 297/130 |
| 1,677,434 | 7/1928 | Dorton | 297/364 |
| 2,658,554 | 11/1953 | Spector et al. | 297/134 |
| 3,062,583 | 11/1962 | Hamilton | 297/254 X |
| 3,404,917 | 6/1966 | Smith | 297/250 |
| 3,794,379 | 2/1974 | Furey | 297/250 |
| 3,934,934 | 1/1976 | Farrell, Jr. et al. | 297/254 |
| 3,975,050 | 8/1976 | McKee | 297/349 |
| 4,113,306 | 9/1978 | von Wimmersperg | 297/216 |
| 4,205,877 | 6/1980 | Ettridge | 297/321 |
| 4,274,674 | 6/1981 | Deloustal | 297/250 |
| 4,306,749 | 12/1981 | Deloustal | 297/130 |
| 4,545,613 | 10/1985 | Martel et al. | 297/250 |

FOREIGN PATENT DOCUMENTS 268768 10/1929 Italy ................................ 297/134

Primary Examiner—Francis K. Zugel
Attorney, Agent, or Firm—Workman, Nydegger & Jensen

[57] ABSTRACT

An adjustable child restraint car seat comprises a base which can be attached to the seat of a vehicle by the vehicles lap belts. A seat having a reclinable back portion is latch locked onto a pivot which is swivel mounted on the base. A first adjustable means for holding the reclinable back in fixed relation to the seat portion and a second adjustable means for holding the pivot in fixed relation to the base allow reconfiguration of the child restraint car seat as required.

13 Claims, 4 Drawing Sheets

CHILD RESTRAINT DEVICE

BACKGROUND OF THE INVENTION

The present invention relates to restraint devices useful for holding a person in a vehicle. More specifically, the present invention relates to a reclinable and rotatable child restraint car seat for a child which can be adjusted into various configurations according to the needs and desires of the operator. The present invention is particularly, but not exclusively, useful for the protection of children during vehicular travel and for ease in placing them in the vehicle and removing them from the vehicle.

DESCRIPTION OF THE PRIOR ART

Although vehicle safety has always been of general concern to motorists, we have recently seen increased attention being given to the safety concerns of the individual passenger. More specifically, both the enactment of seat belt laws and the conduct of information campaigns which encourage passengers to "Buckle-Up" are indicative of governmental attempts to arouse public awareness of the importance of passenger safety.

Of particular concern in this matter, is the safety of children. Whereas, restraint harnesses incorporated into the vehicle's structure are generally sufficient for the safety of older children and adults, infants pose several unique problems which are well known by anyone who has traveled with them.

Without specifically enumerating these problems, it is apparent that the infant's safety and comfort are of great importance. Additionally, it is desirable that the infant child be conveniently accessible while being restrained and that the device or apparatus used to restrain the child be easily operable. Further, it is desirable that the child restraint device be versatile and adaptable to meet the various needs of the operator.

Several devices have been proposed in the past which are useful for transporting children in a vehicle. In each instance, the prior device has addressed a specific problem and disclosed inventions intended to increase both safety and convenience. For example, U.S. Pat. No. 3,404,917 which issued to Smith for an invention entitled "Mounting Bracket for Automobile Baby Seat" discloses a bracket for mounting a baby seat on the bench portion of the passenger seat of a vehicle. U. S. Pat. No. 4,205,677 which issued to Ettridge for an invention entitled "Children's Reclining Car Seats" discloses structure for moving a child's car seat between a slumbering and a sitting position. Still another feature for improving a child's car seat is disclosed in U.S. Pat. No. 4,113,306 which issued to von Wimmersperg for an invention entitled "Convertible Child Restraint". Specifically, the device disclosed by von Wimmersperg is a vehicular safety restraint seat for a child which is convertible to a stroller.

While the prior art discloses various devices which include reclinable seats and convertible strollers, there is no teaching which maximizes the potential configurations for a child restraint car seat while the seat is secured to the vehicle. The present invention recognizes that in addition to having a reclining capability, it is desirable to have the capability of positioning the child in the car in other than a forward and back orientation. Specifically, the present invention recognizes that it is often desirable and advantageous to orient the child lengthwise on the passenger seat of a vehicle while the child restraint car seat is secured to the vehicle. Preferably this lengthwise orientation can be accomplished while still having the capability of reclining the seat into a slumbering position. Further, the present invention recognizes it is desirable that a seat, having the versatile configurations discussed above, be easily removed from the vehicle and adapted for use as a stroller.

In light of the above, it is an object of the present invention to provide a child restraint car seat with a reclinable back which can be turned or swiveled while secured in the car to orient the child lengthwise in the vehicle.

It is another object of the present invention to provide a child restraint device which provides safety for the child regardless of the configuration of the device, i.e. whether it be in an upright or reclined configuration or positioned in a front-back or lengthwise orientation.

It is still another object of the present invention to provide a child restraint device which is easily removed from the vehicle and converted for use as a stroller.

Yet another object of this invention is to provide a child restraint device which is easy and relatively inexpensive to manufactured.

SUMMARY OF THE INVENTION

The preferred embodiment of the child restraint car seat of the present invention comprises a base which can be attached and secured to the seat of the vehicle. A pivot, which is swivel mounted on the base, can be gripped and held relative to the base in predetermined positions. A seat having latch connectors is removably attached to the pivot by the interaction of the latch connectors with attachment pins on the pivot. A back is pivotally attached to the seat and connected thereto by means which allow the back to be reclined into predetermined positions relative to the seat. A seven-point restraint harness is provided to hold the child against the seat and back. In use, the seat and reclinable back in combination can be attached to or removed from the pivot by manual operation of the latch means. When attached to the pivot the combination of seat and back can be swiveled relative to the base and held in predetermined relationships thereto. While the base is secured to the vehicle, adjustments of the seat and back allow the operator to configure the combination for easy handling of the child.

The novel features of this invention as well as the invention itself both as to its organization and operation will be best understood from the accompanying drawings taken in conjunction with the accompanying description in which similar reference characters refer to similar parts and in which:

DESCRIPTION OF THE PREFERRED EMBODIMENT

Figure 1:
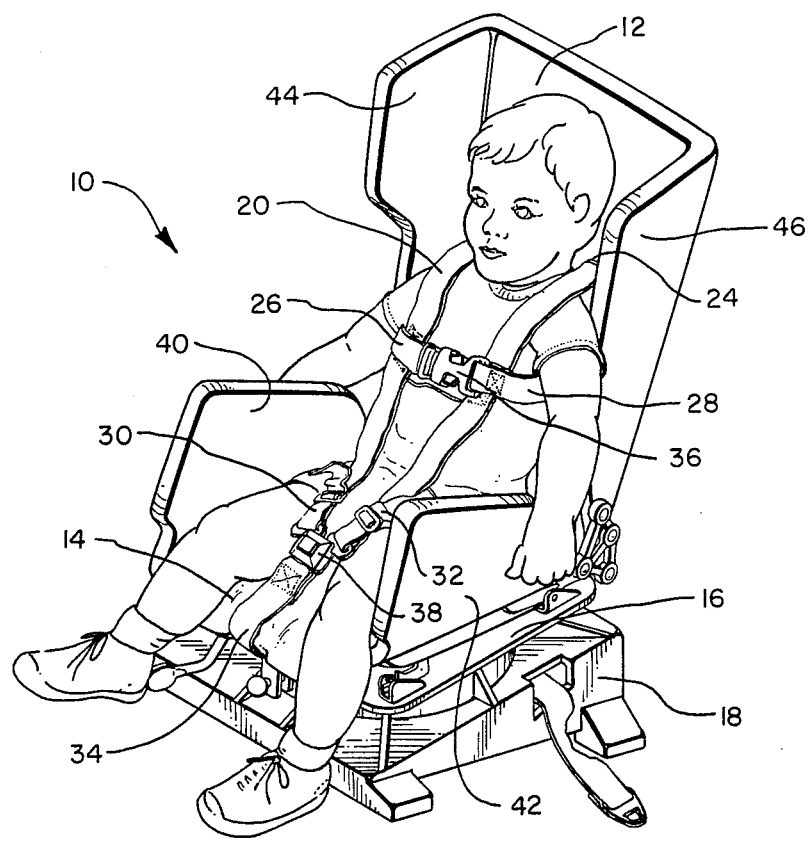
FIG. 1 is a front perspective view of the child restraint device.

The child restraint device of the present invention is shown in FIG. 1 and generally designated 10. As shown, child restraint device 10 comprises a back 12 which is pivotally connected with a seat portion 14 in a manner to be subsequently disclosed in greater detail. Back 12 is reclinable relative to seat 14 to allow restraint device 10 to be configured either for a sitting position, generally shown in FIGS. 1 and 2, or in a reclining position generally shown in FIG. 4.

As intended for the present invention, pivot 16 and base 16 constitute a pedestal on which seat 14 can be attachably mounted. Specifically, seat 14 of restraint device 10 is mounted on pivot 16 which is swivel mounted onto base 16. When seat 14 is attached to pivot 16, it will be appreciated that the seat 14, in combination with pivot 16, can be swiveled relative to the base 16. This allows reconfiguration of restraint device 10 by rotation of seat 14 and back 12 with respect to the base 18.

A harness 20 is provided with restraint device 10 for the purpose of holding an infant child against restraint device 10 during its use. As will be appreciated by those skilled in the art harness 20 is adjustable to be specifically configured in accordance with the shape and size of the child. As clearly shown in FIG. 1, harness 20 is a seven-point restraint harness four of which are attached to back 12 of the restraint device 10 at the points 22, 24, 26 and 28. With these attachment points, the child can be positioned with its arms respectively inserted through the opening created between attachment points 22 and 26 and through the opening created between attachment points 24 and 28. Further, a chest buckle 36 is provided to allow these parts of the harness to hold and restrain the child against back 12. Harness 24 is also attached to seat 14 at attachment points 30, 32 and 34. To help hold and restrain the child in device 10, the harness strap from attachment point 34 is brought within the crotch of the child so that one of the child's legs is extended through the opening created between attachment point 30 and 34 and the other leg is extended through the opening created between attachment points 32 and 34. A lap buckle 36 is provided, as shown, to bring the lower portion of harness 20 into position to restrain the child against the seat 14.

Additional safety features of the restraint device 10 are provided by sideboard 40 and 42 which are positioned relative to seat 14 to restrict lateral movement of the lower portion of the child's body with respect to restraint device 10. Restraint device 10 is also provided with side pieces 44 and 46 to restrict the sideward movement of the upper portion of the child's body with respect to back 12 of the restraint device 10.

Figure 2:
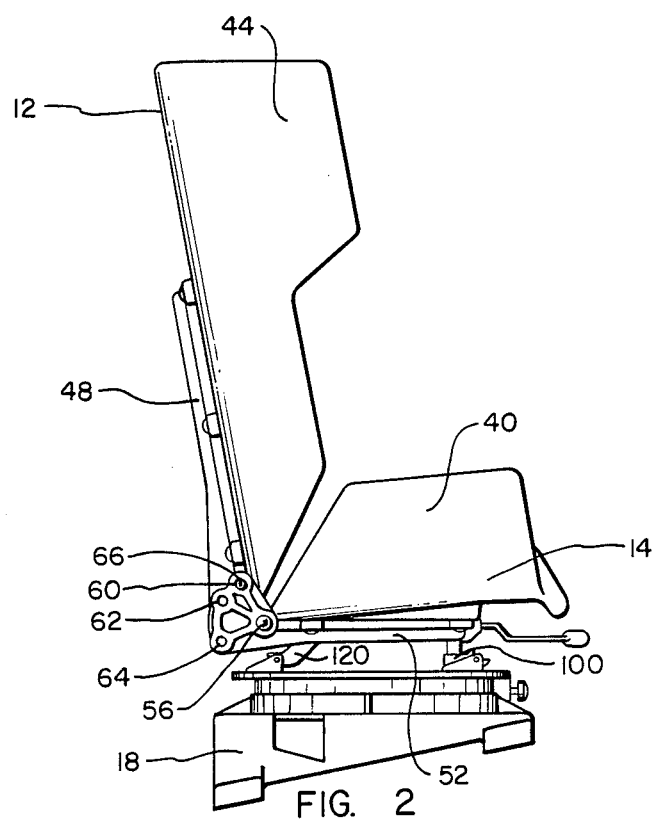
FIG. 2 is a side elevational view of the device in a sitting position.
Figure 3:
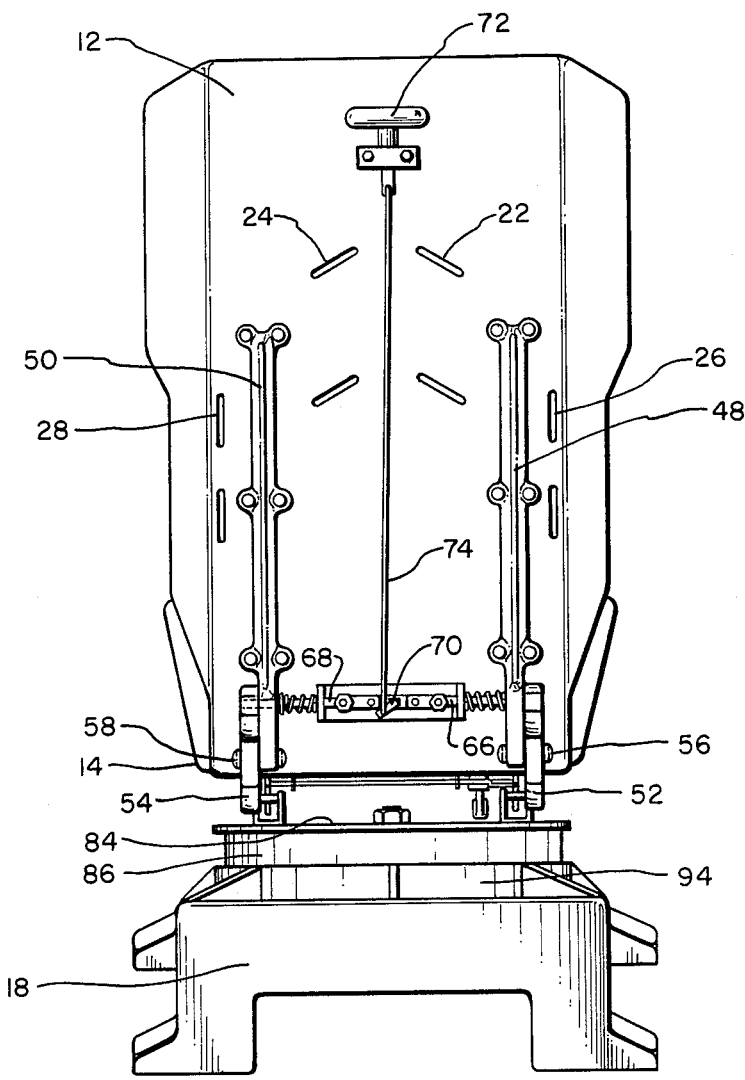
FIG. 3 is a back elevational view of the device.

Cross referencing FIG. 2 and FIG. 3 shows the cooperation of structure employed by the present invention which allows back 12 to recline relative to seat 14. More specifically, it is seen in FIG. 3 that back supports 48 and 50 are attached to back 12 by any means well known in the art, such as by bolting. It is understood that means such as cementing or welding back supports 48 and 50 to back 12 would also suffice for the present invention. Further, it can be appreciated that seat supports 52 and 54 are attached to seat 14 in a like manner. While only seat support 52 is shown in FIG. 2 as extending along the length of seat 14 to provide rigidity, it should be recognized that seat support 54 extends along the underside of seat 14 in a like manner.

As perhaps best seen in FIG. 3, back supports 48 and 50 interact with seat supports 52 and 54 to provide means for reclining back 12 relative to seat 14. The pivotal connection between back 12 and seat 14 is accomplished by connector pins 56 and 58 which together establish an axis about which back 12 can be rotated or reclined relative to seat 14. Specifically, connector pin 56 interacts between back support 46 and seat support 52 while back. support 50 interacts with seat support 54.

Referring now to FIG. 2, it can be seen that seat support 52 is provided with a series of holes 60, 62 and 64 which are radially located and equidistant from the rotational axis defined by the hole into which connector pin 56 is inserted. Although not shown, it is to be understood that seat support 54 is formed with a series of holes similar to those of seat support 52. These holes, like holes 60, 62 and 64 are radially located and equidistant from the axis defined by connector pins 56 and 58.

With reference now to FIG. 3, it is shown that pins 66 and 68, respectively, cooperate with back supports 48 and 50 by insertion through holes (not shown) formed thereon. As intended for the present invention, these pins 66 and 68 extend through back supports 48 and 50 with pin 66 being insertable into holes 60, 62, 64 on seat support 52 and pin 68 being insertable into corresponding holes similarly located on seat support 54. It will be understood by the skilled artesan that upon simultaneous insertion of retainer pins 66 and 68, respectively, through back supports 48 and 50 and through seat supports 52 and 54 that back 12 will be held rigid in with respect to the seat 14. On the other hand, when retainer pins 66 and 68 are withdrawn from holes in seat support 52 and 54, back 12 can be reclined or moved with respect to seat 14.

Activation of retainer pins 66 and 68 is accomplished by an actuator 70 which is located on back 12 and operatively connected to retainer pins 66 and 68. Actuator 70 is operable by manipulation of the handle 72 which is also located on back handle 72 transmits a force through cable 74 which causes actuator 70 to simultaneously withdraw retainer pins 66 and 68 from corresponding holes located in seat supports 52 and 54. This action respectively disengages back support 46 from seat support 52 and back support 50 from seat support 54 to allow repositioning of back 12 with respect to seat 14. The result is perhaps best seen by comparing the configuration of child restraint device 10, as it is shown in FIG. 2, with the its configuration shown in FIG. 4. The upright sitting position of FIG. 2 is accomplished when retainer pin 66 is inserted through back support 48 and into hole 60 on seat support 52. While retainer pin 66 is inserted into hole 60, retainer pin 68 is inserted into the corresponding hole as seat support 54 to hold back support 50 in a fixed relationship with seat support 54.

Figure 4:
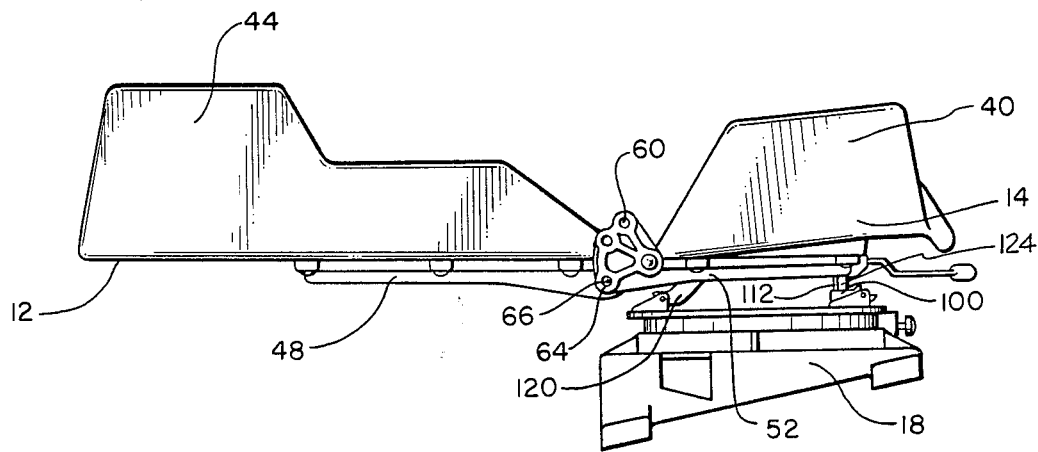
FIG. 4 is a side elevational view of the device in a reclined position.

In FIG. 4, restraint device 10 is shown in a reclining position. In this position, retainer pin 66 is inserted through back support 48 and into hole 64 located on seat support 52. Likewise, retainer pin 68 is inserted through back support 50 and into a hole (not shown) located on seat support 54 which corresponds to hole 64. Thus, for the upright position shown in FIG. 2, or the reclining position shown in FIG. 4, or the intermediate position wherein retainer pin 66 is inserted into hole 62 and retainer pin 68 is inserted into a corresponding hole on seat support 54, back 12 can be fixedly positioned relative to seat 14.

Figure 5:
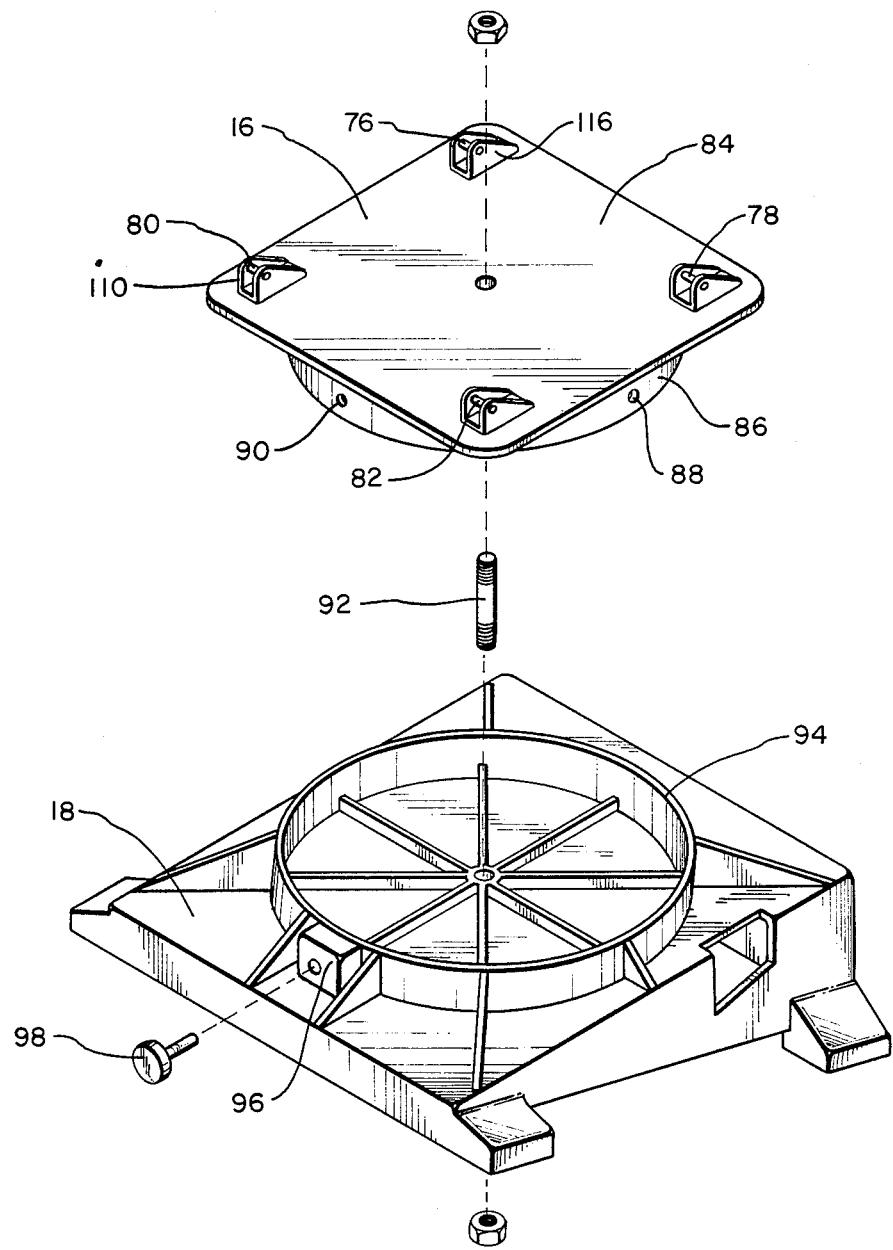
FIG. 5 is an exploded perspective view of the pedestal for the present invention.

The pedestal for the present invention on which seat 14 is removably mountable is best shown in FIG. 5. As seen in FIG. 5, the pedestal comprises a pivot 16 and base 18. Specifically, pivot 16 comprises a platform 84 on which are affixed a rear attachment pin 76 and a rear attachment pin 78. Further, platform 84 is provided with a front attachment pin 80 and a front attachment pin 82. Each of the attachment pins 76, 78, 80 and 82 are attached to respective mounts. For example, rear attachment pin 76 is shown attached to a mount 116 and front attachment pin 80 is shown attached to a mount 110. On the side of platform 84 opposite from attachments pins 76, 78, 80 and 82 is a ring 86. Ring 86 is formed with a series of holes of which hole 88 and hole 90 are representative. For purposes of the present invention four such holes are utilized to permit the swiveling of pivot 16 through a 90° rotation.

Also shown in FIG. 5 is the base 18 of the present invention. Base 18 is provided with a ring 94 which has an inside diameter that is slightly larger than the outside diameter of the ring 86. Thus, pivot 16 can be joined to base 16 by a shaft 92 in a manner which provides for insertion of ring 86 within the ring 94. It will be appreciated that the interaction of ring 86 with ring 94 provides added lateral stability for the pedestal while still permitting relative rotational movement between pivot 16 and base 18.

A housing 96, also shown in FIG. 5, is mounted on base 16 and holds a manually operable spring-loaded bolt 96. The bolt 96 is spring-biased for insertion into holes on ring 86 to hold ring 86 fixed relative to ring 94. Withdrawal of the bolt 96 from a hole in ring 86 clears the inside surface between rings 86 and 94 to allow for free rotation or swiveling of the pivot 16 relative to the base 16. Thus, wherever pivot 16 is in a position where a hole, such as hole 66 or hole 90, is aligned with the bolt 96, release of the bolt 98 for insertion into the hole 88 or hole 90 fixes pivot 16 relative to base 18 and prevents further rotation therebetween. It is to be understood that while the spring-loaded bolt 98 is disclosed for the present invention as a preferred embodiment, any structure which clamps or fixes pivot 16 relative to base 18 is within the contemplation of the present invention.

As previously implied, seat 12 of restraint device 10 is removably attached to base 16 at the attachment pins 76, 78, 80 and 82. It will be appreciated by the skilled artesan that seat 12 may be slide mounted onto base 16 by incorporating slide connectors well known in the pertinent art. More specifically, for the preferred embodiment, a pair of forks are attached on the underside and to the rear of seat 14. Also, a pair of latches are attached on the underside and to the front representative of the two such fork attachments to seat 14. Fork 120 can be associated with attachment pin 76 in a manner generally shown in FIG. 8. Likewise, a corresponding fork (not shown) can be associated with attachment pin 78. Once the forks are associated with attachment pins 76 and 78, latches on seat 12 can then be attached to pivot 16.

Figure 6A:
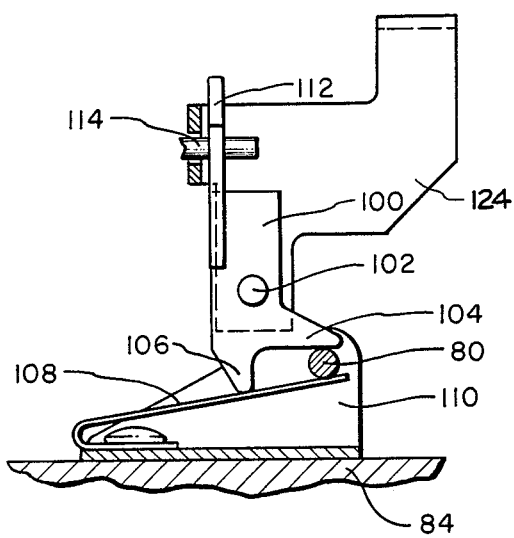
FIG. 6A is a side view of a front latch assembly in an unengaged position.
Figure 6B:
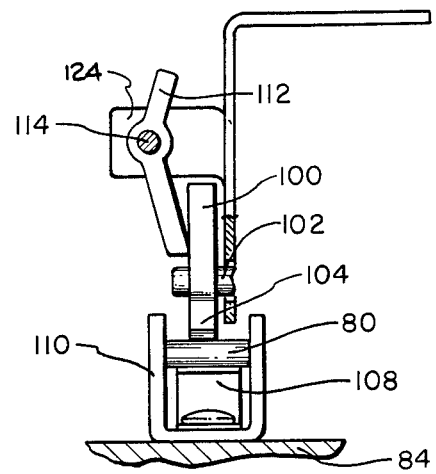
FIG. 6B is a front view of the a front latch assembly in an unengaged position.
Figure 7A:
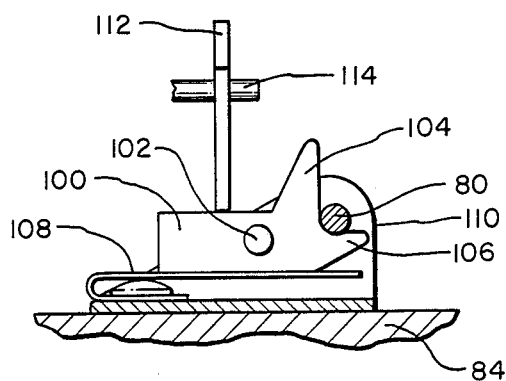
FIG. 7A is a side view of the front latch assembly in an engaged position.

The attachment of the latches of pivot 16 to the attachment pins 80 and 82 of base 18 can be best seen in reference to FIGS. 6A, 6B, 7A and 7B. In FIG. 6A latch 100 is shown rotationally mounted on a mounting pin 102. Recognize that though not shown in the figures, mounting pin 102 is fixedly attached in any manner well known in the pertinent art to the bottom of seat 12. More specifically, by cross-referencing FIGS. 4, 6A and 6B it can be seen that mounting pin 102 is attached to post 124 which is, in turn, fixed to seat 14. Also, in FIG. 6A, latch 100 is seen with an arm 104 and an extension 106 and front attachment pin 80 is shown in its relation to mount 110. A leaf spring 108, which is associated with mount 110 to urge against the engagement of latch 100 with front attachment pin 80, is shown in its relaxed position in FIG. 6A. A trunnion 114 is attached to seat 14 and a lever 112 is rotationally mounted thereon. More specifically, as shown in FIGS. 4, 6A and 6B, trunion 114 is mountedon post 124 and lever 112 is rotationally monted on trunion 114. In the positions shown in FIGS. 6A and 6B, lever 112 is not interacting with latch 100. However, upon urging mounting pin 102 with associated latch 100 downward onto attachment pin 180, leaf spring 108 is depressed and latch 100 is rotated about mounting pin 102 in a manner which brings arm 104 and extension 106 into cooperation with front attachment pin 80 substantially as shown in FIG. 7A. Then, with latch 100 in this position, lever 112 is biased to rotate about trunnion 114 to engage and retain latch 100 in the position shown in FIGS. 7A and 7B. The release of lever 112 by rotating it about trunnion 114 allows latch 100 to be returned to the position shown in FIGS. 6A and 6B for further disengagement of seat 14 from pivot 16.

Figure 7B:
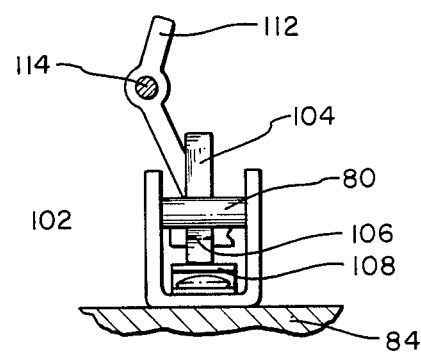
FIG. 7B is a front view of a front latch assembly in an engaged position.

In comparing the engaged and disengaged positions of latch 100 with respect to attachment pin 80 the respective front views of these positions shown in FIGS. 6B and 7B are helpful. More specifically, the views of FIGS. 6B and 7B show the interaction between latch 100 and lever 112.

Figure 8:
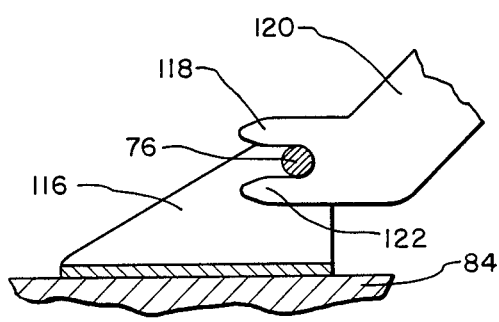
FIG. 8 is a side view of a rear attachment fork in an engaged position.

FIG. 8 shows a fork 120 provided with tangs 118 and 122 which engagingly surround rear attachment pin 76. As stated above, rear attachment pin 76 is associated with mount 116 and provides a means for engagement with fork 120 to help hold seat 14 onto pivot 16. It is to be understood that the discussion concerning latch 100 in cooperation with attachment pin 80 and the cooperation of fork 120 with attachment pin 76 has focused on only the right side of device 10. It is to be understood that a plurality of such attachment means can be used for the present invention. More specifically, as intended by the present invention, latch 100 and fork 120 are each one of a pair of such mechanisms. Another latch corresponding to latch 100 and another fork corresponding to fork 120 are provided for the other side of seat 14. With these means, seat 14 can be fixedly engaged with pivot 16 or released therefrom to lift and remove seat 14 from pivot 16 for use as desired by the operator.

OPERATION

For its operation the child restraint device 10 of the present invention is provided with a back portion 12 which is reclinable relative to seat 14 through manipulation of an actuator 70. More specifically, operation of handle 72 rotates actuator 70 to retract retainer pins 66 and 68 from holes in seat supports 52 and 54 which are respectively aligned with holes in back supports 48 and 50. Upon such a retraction of retainer pins 66 and 68, back 12 can be reclined and repositioned with respect to the seat 14 to align holes on back supports 48 and 50 with a new set of holes on seat supports 52 and 54. Once so aligned, release of handle 72 causes reinsertion of retainer pins 66 and 68 into the aligned holes to rigidly hold back 12 relative to seat 14.

Once back 12 is aligned with respect to seat 14 a child can be placed within the restraint device 10 and secured therein by manipulation of the harness 20. More specifically, the seven-point restraint harness 20 of the present invention allows for harness support around the arms of the child, as well as across the waist of the child and up through the crotch. Chest buckle 36 and lap buckle 38 are provided as shown in FIG. 1 for securing harness 20 in a manner which will restrain the child in the restraint device 10.

Seat 14 and back 12, in combination, can be removably attached with pivot 16 by respectively engaging fork 120, and the corresponding fork (not shown) on the other side of seat 14, with rear attachment pins 76 and 78, Once these forks are engaged with rear attachment pins 76 and 78, latch 100 and the corresponding latch (not shown) on the other side of seat 14 are brought into respective engagement with front attachment pins 80 and 82. Depression of the seat 12 against pivot 16 causes engagement of the latches with front attachment pins 80 and 82, This engagement depresses leaf spring 108, and a corresponding leaf spring for the other latch point, to allow latch 100 to rotate about mounting pin 102 and engage with front attachment pin 80 in a manner substantially as shown in FIG. 7A. Likewise, the Latch (not shown) corresponding to Latch 100, engages with front mounting pin 82. Once such engagements are accomplished lever 112 is activated to lock the latch 100 in the popition shown in FIG. 7A. The actual positioning of lever 112 in this position is best peen by reference to FIG. 7B. Similar operation of the latch (not shown) on the opposite front side of seat 12 causes engagement of the seat 12 with the pivot 16.

As best seen by reference to FIG. 5, pivot 16 is provided for cooperative engagement with base 18 in a manner which causes the ring 86 of pivot 16 to be inserted within the space defined by the ring 94 on base 18. A spring loaded bolt 98 held in housing 96 ip aligned for cooperation with holes 88 and 90 and other similar holes (not shown) located on the ring 86 of pivot 16. It will be understood by the skilled artesan that insertion of spring-loaded bolt 98 into any of the holes located on ring 86 of Pivot 16 will fix the relationship of pivot 16 relative to base 18. Withdrawal of pin 98 from the holes on ring 86 will free pivot 16 relative to base 18 and allow a swiveling or rotating action therebetween.

In accordance with the above discussion, operation of handle 72 permits reclining of back 12 relative to seat 14 and operation of spring-loaded bolt 98 permits swiveling of pivot 16 relative to the bape 18. Thus, once attachment between seat 14 and pivot 16 has been accomplished by the interaction of the latches and corresponding attachment pins, restraint device 10 of the present invention provides a reclinable child restraint seat which can be swiveled relative to the base 18 to facilitate handling of the child.

It is to be understood that, when seat 14 and its associated reclinable back 12 are disengaged and removed from pivot 16, fork 120 and its corresponding counterpart on the otherside together with the latch 100 and its corresponding counterpart on the other side of seat 14 can be engaged with a means (not shown) to provide a stroller for the child. More specifically, it is intended by the present invention that the seat 14 be engageable with a wheeled platform in a manner similar to that discloped for the interaction and connection of seat 14 with pivot 16. This would allow the seat 14 and its associate reclinable back 12 to be operated ap a stroller (not shown), The intent alpo of the present invention is to provide attachments through structures such as fork 120 and latch 100 to allow for the interaction of the seat 14 with various platforms which can be designed and incorporated to accomplish the desires of the operator.

Although not specifically set forth in the disclosure for the present invention, it is within contemplation of the present invention and within the intention of the present invention that the base 18 be secured relative to the vehicle in which the restraint device 10 is to be used. More specifically, and in accordance with teaching of prior disclosures, it is intended that base 18 be secured to the seat of vehicle by the lap belts or safety belts provided and incorporated into the vehicle for normal use by an adult during transportation.

While the particular child restraint device as herein shown and disclosed in detail is fully capable of obtaining the objects and providing the advantages herein before stated, it is to be understood that it is merely illustrative of the presently preferred embodiment of the invention and that no limitations are intended to the details of construction or design herein shown other than as defined in the appended claims.

I claim:

1. A child restraint car seat comprising:
   a base;
   a pivot, swivel mounted on said base;
   a seat;
   a plurality of pin assemblies attached to said pivot;
   a plurality of latch means attached to said seat and respectively engageable with said pin assemblies for removably holding said seat on said pivot;
   a back, reclinably attached to said seat;
   means for fixing said back relative to said seat; and
   means for fixing said pivot relative to said base.

2. A child restraint car seat as recited in claim 1 wherein said back fixing means comprises:
   a plurality of back supports attached to said back;
   a plurality of seat supports fixedly attached to said seat; and
   means for rigidly holding said back support means relative to said seat support means.

3. A child restraint car seat as recited in claim 2 wherein said means for rigidly holding said seat support relative to said back support is a pin interconnected therebetween.

4. A child restraint car seat as recited in claim 1 wherein said pivot fixing means comprises a bolt engageable between said pivot and said base.

5. A child restraint car seat as recited in claim 2 wherein said pivot fixing means comprises a spring loaded bolt engageable between said pivot and said base.

6. A child restraint car seat as recited in claim 5 further comprising a restraint harness having a plurality of straps, said straps being respectively attached to said back at a plurality of locations and attached to said seat at a plurality of locations and adjustable with respect to said seat and said back for securing the child in said car seat.

7. A restraint for holding a child in a vehicle comprises:
   a seat;
   a back reclinably attached to said seat;

a harness attached to said seat and said back and adjustable with respect thereto for restraining the child therein;

a swivelable pedestal having means for securing said pedestal to the vehicle;

means for immobilizing said pedestal;

a plurality of pin assemblies attached to said pedestal; and a plurality of latch means attached to said seat and respectively engageable with said pin assemblies for removably holding said seat on said pedestal 8. A restraint for holding a child in a vehicle as recited in claim 7 which further comprises means for fixing said back portion relative to said seat.

9. A restraint for holding a child in a vehicle as recited in claim 8 wherein said back fixing means comprises:

a plurality of back supports attached to said back;

a plurality of seat supports fixedly attached to said seat; and means for rigidly holding said back support means relative to said seat support means.

10. A restraint for holding a child in a vehicle as recited in claim 9 wherein said pedestal comprises:

a base; and a pivot, swivel mounted on said base.

11. A restraint for holding a child in a vehicle as recited in claim 10 further comprising means for fixing said pivot relative to said base.

12. A restraint for holding a child in a vehicle as recited in claim 11 wherein said pivot fixing means comprises a bolt engageable between said pivot and said base.

13. A restraint for holding a child in a vehicle as recited in claim 12 wherein said restraint harness comprises a plurality of straps attached to said back and said seat at a plurality of locations and adjustable with respect to said seat and said back for securing the child relative to said car seat.

* * * * *